(12) United States Patent
Jordil et al.

(10) Patent No.: US 7,503,125 B2
(45) Date of Patent: Mar. 17, 2009

(54) COORDINATE MEASURING METHOD AND DEVICE

(75) Inventors: Pascal Jordil, Ecotaux (CH); Bo Pettersson, London (GB)

(73) Assignee: Hexagon Metrology AB, Nacka Strand (SE)

( * ) Notice: Subject to any disclaimer, the term of this patent is extended or adjusted under 35 U.S.C. 154(b) by 0 days.

(21) Appl. No.: 12/111,630

(22) Filed: Apr. 29, 2008

(65) Prior Publication Data

US 2008/0271332 A1 Nov. 6, 2008

(30) Foreign Application Priority Data

May 4, 2007 (EP) .................................. 07107540

(51) Int. Cl.
*G01B 5/008* (2006.01)
*G01B 5/004* (2006.01)

(52) U.S. Cl. ............................... 33/503; 33/551; 33/559

(58) Field of Classification Search ........... 33/503–504, 33/1 M, 549, 551, 556, 558–559, 561, 568, 33/572, 573, 553–554
See application file for complete search history.

(56) References Cited

U.S. PATENT DOCUMENTS

| | | | |
|---|---|---|---|
| 3,869,799 A | 3/1975 | Neuer et al. | |
| 5,189,806 A | 3/1993 | McMurtry et al. | |
| 5,251,156 A | 10/1993 | Heier et al. | |
| 7,131,207 B2 * | 11/2006 | McFarland | 33/503 |
| 7,227,647 B2 * | 6/2007 | Ferger | 33/559 |
| 7,269,910 B2 * | 9/2007 | Raab et al. | 33/503 |
| 7,310,889 B2 * | 12/2007 | Stamenkovic | 33/503 |
| 2004/0148791 A1 * | 8/2004 | Eaton | 33/503 |
| 2005/0166413 A1 | 8/2005 | Crampton | |
| 2007/0277600 A1 * | 12/2007 | Nokuo et al. | 33/501 |
| 2008/0235969 A1 * | 10/2008 | Jordil et al. | 33/503 |
| 2008/0249737 A1 * | 10/2008 | Jordil et al. | 33/503 |

FOREIGN PATENT DOCUMENTS

| | | |
|---|---|---|
| EP | 1610087 | 12/2005 |
| EP | 1718924 | 11/2006 |

OTHER PUBLICATIONS

International Search Report dated Jul. 13, 2007.

* cited by examiner

*Primary Examiner*—Yaritza Guadalupe-McCall
(74) *Attorney, Agent, or Firm*—Pearne & Gordon LLP (57) ABSTRACT

A measuring method and system involving a measuring coordinate probe, which can be moved precisely, by appropriate actuators, with respect to a positioning platform (60) on which the probe is mounted; and whose position relative capable to said positioning platform (60) can be measured, by suitable encoders (780). The invention can be carried out with probes, actuators and encoders of different nature. The actuators (730) preferably allow the motion of the probe according to two or more independent degrees of freedom, so that the probe itself can be moved in a plane, or in a three-dimensional region of space, and its orientation can be chosen, within some suitable limits. The method and system of the invention provide very exact local measurement, even if the platform (60) does not deliver the very best precision.

14 Claims, 8 Drawing Sheets

COORDINATE MEASURING METHOD AND DEVICE

REFERENCE DATA

The present application claims priority from European Patent Application EP07107540, filed on May 4, 2007, in the name of the same applicant.

FIELD OF THE INVENTION

The subject technology relates generally with coordinate measuring methods and in particular, but not exclusively, with coordinate measuring machines and with their methods of use. These are devices for dimensional measuring are used to measure coordinates of points on the surface of mechanical elements, by means of an appropriate measuring probe. The measuring probe that may be of contact type, for example a touch probe, or non-contact type, like an optical probe or a laser probe. The scope of the present invention is not, however, limited to this particular class of devices.

DESCRIPTION OF RELATED ART

Coordinate positioning machines, also indicate as coordinate measuring machines, or CMM, generally comprise a fixed reference surface, for example a massive granite table chosen for its high rigidity and dimensional stability, and a kinematics system movable relative to the fixed reference surface and carrying the measuring probe. Examples are known, however, of coordinate measuring machines in which the reference surface is movable, and the measuring probe is fixed.

Figure 1:
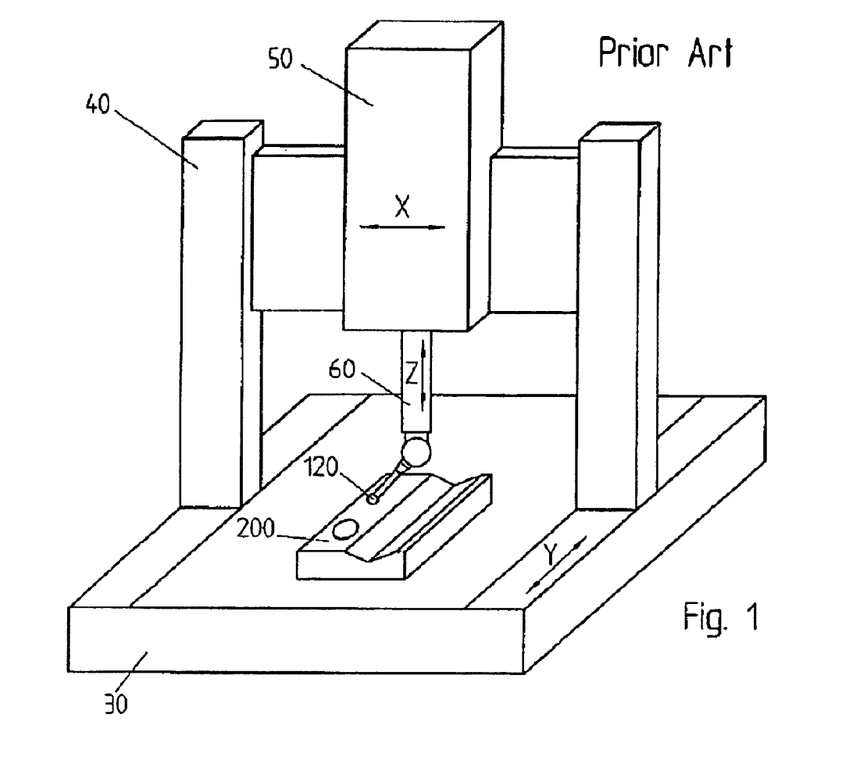
FIG. 1 shows a simplified view of a generic CMM machine of known type.

FIG. 1 represents, in a very simplified manner, a CMM of known type. The kinematics system takes the shape, for example, of a moving gantry superstructure 40, also called a bridge, movable parallel to one side (Y axis) of the fixed reference base 30. The horizontal transverse of the gantry 40 carries a sliding carriage 50 moving along a horizontal direction perpendicular to the Y axis (X axis). The third axis of movement (Z axis) is provided by a vertical spindle 60 which moves up and down relative to the carriage 50. The measuring probe is connected to the end of the spindle 60 and, by the X, Y and Z movement described hereupon, can be freely moved in a three-dimensional measuring space. Other coordinate positioning machines are also known, which use articulated arms with rotational joints.

The measuring probe is often a touch probe, having a spring loaded stylus carrying a calibrated ruby ball 120. As the probe touches the surface of the piece 200 to be measured, the X, Y, Z coordinates, obtained by appropriate encoders on the axes, are simultaneously sent to the CMM controller which determines accurately the coordinates of the contact point, by known computing methods. The simpler measuring probes are touch-trigger probe, which determine the instant in time of the contact, as described, for example in EP1610087.

Other probes can determine the amount of deflection of the stylus, for example by an LVDT or strain gauge sensor, and transmit this deflection to the controller, to be integrated in the coordinate calculation. Such probes are termed scanning probes, because they are particularly suitable for scanning measurement in which the probe is in continuous contact with the measured piece. In some cases also simple touch probes are used in continuous scanning mode, or are oscillated to touch the surface of the piece 200 in a number of closed-spaced points (tapping), whose coordinates XYZ are recorded by the controller of the CMM machine.

A class of optical probes that can be used in CMM are micro-imaging digital systems, which are moved like the mechanical measuring probes, and are aimed at the point whose coordinates are to be measured, instead of touching the material, allowing 3-D coordinate measurements.

Laser coordinate probes can likewise be used which are able to determine the coordinate of points on the surface of a measured object as they are illuminated by a scanning laser beam. It is also known, in this class of optical measuring probe, to open the laser in a fan-shaped beam, in order to acquire a large number of points along a laser line, while the line is passed along the piece. Alternately, the laser beams may be arranged to illuminate a plurality of measure points in a grid.

Both imaging probes and laser probes belong to the category of contact-less probes, that is they can provide coordinate of points on the surface under test, without physical contact.

Another kind of known coordinate machines departs from the gantry structure described above, in favor of an articulated-arm kinematics system. Such devices are illustrated, among other, by EP1718924, and comprise, in place of a set of linear axes X, Y, Z, and an articulated arm including a series of rotation joints, fixed at one end, and carrying a coordinate probe, optical or mechanical at the other end. The articulation of the arm allows free movement of the measuring probe in a 3-D measuring space.

Precision is the main and most desired feature of any CMM machine. Maximal tolerated errors of the order of one micrometer, or even better, are not uncommon. Such extreme precisions are obtained in the art by providing a very stiff and stable structure, by using advanced position encoders and by elaborate calibration and error-correction procedures. Such measures however bring also negative effects in that they increase bulk, mass, and cost of the system, while long and complex calibrations may reduce ease of use. In many cases, ultimate precision can not be delivered if the measuring span of the machine is large, or if high-speed movement of the probe are needed, and a compromise has to be found between these opposing characteristics.

It is also known to use industrial robots, manipulators, and/or robotized arms, to perform repetitive tasks on workpieces in a production system, like for example painting, welding, assembling, or positioning. In some cases industrial robots are used also for inspecting workpieces, for example by measuring probes or optical inspection cameras. While industrial robots are versatile and fast, they do not exhibit, as a rule, the precision requested from metrology equipments.

There is therefore a need for a measuring method that overcomes the above limitations, and in particular for a measuring method combining high precision, fast motion, without presenting the above described shortcomings.

BRIEF SUMMARY OF THE INVENTION

According to the invention, these aims are achieved by means of the object of the accompanying claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 2:
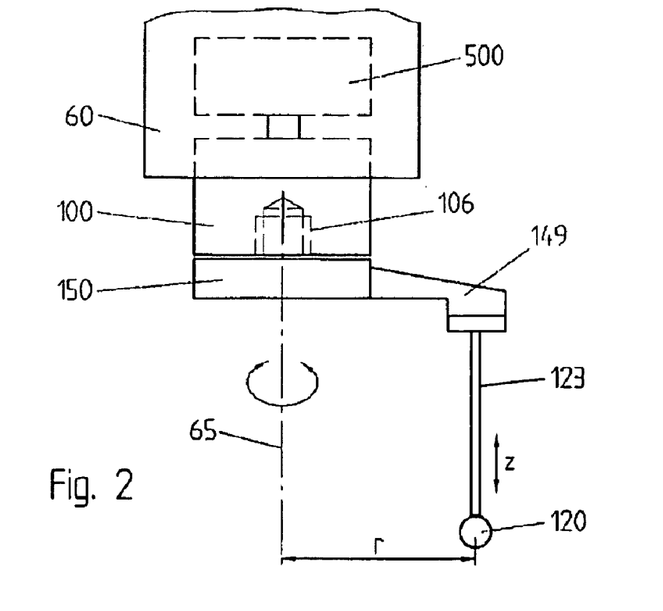
FIG. 2 illustrates a positioning platform and a movable coordinate measuring probe according to one aspect of the present invention.

According to a first aspect of the invention, represented in FIG. 2, the measurement involves a contact probe 150 carrying a calibrated ball 120 at the tip of a stylus 123. The contact probe is attached in an offset position to a rotor 100, which is connected to a positioning platform 60, which could be for example a spindle of a coordinate measuring machine but also, in variant methods, a distal end of a robotized arm of an industrial robot, or a tool-holder in a numerically controlled machine tool, or any other suitable positioning apparatus, capable to position the rotor 100 in a desired position in space, in relation with a workpiece.

The rotor 100 can be rotated around the rotation axis 65 by an appropriate actuator, for example an electric motor 500, either in the positioning device 60 as represented or, in a non-represented equivalent variant, in the rotor itself. The angle of rotation of the rotor 100 is encoded by an optical angle transducer, or by any other appropriate encoder, which is not represented and could equivalently be lodged in the rotor 100 or in the positioning platform 60.

In the following the direction of the "Z" axis will indicate the vertical direction, and the plane determined by the "X" and "Y" axes, as the horizontal plane, with reference to the conventional orientation of these axes. It must be understood, however, that these conventional direction are used for the sake of simplicity only, and do not limit the scope of the present invention, which can be embodied by measuring machines and probes having a generic spatial orientation and any number of displacement axes.

Preferably, the actuator 500 is not limited in the angle of rotation. The rotor 100 can describe several revolutions, in both rotation directions.

The touch probe 150 includes a radial arm 149, so as to offset the ball 120 from the rotation axis 65, by a distance r. Thanks to this feature, the touch probe 150 can scan, while the positioning platform 60 stands still, a circular path on the surface of the piece to be measured, determined by the rotation relative to the vertical axis 65.

Preferably the touch probe 150 is sensitive to displacement of the sphere 120 in one or several directions, for example in the vertical direction z. In this way the CMM equipped with the probe of FIG. 2 can be programmed for measuring the profile and the surface quality of a workpiece along the scanned path.

According to one aspect of the invention, the position of the scanning touch probe 150 and the deflection of the contact sphere 120 can be determined, relative to the positioning platform 60, with greater precision than the absolute position of the positioning device 60 itself. The system described can be used to obtain a relative measure of coordinates of points of the workpiece, along the path that can be scanned by acting on the probe's rotation position, without moving the positioning device 60.

Figure 3:
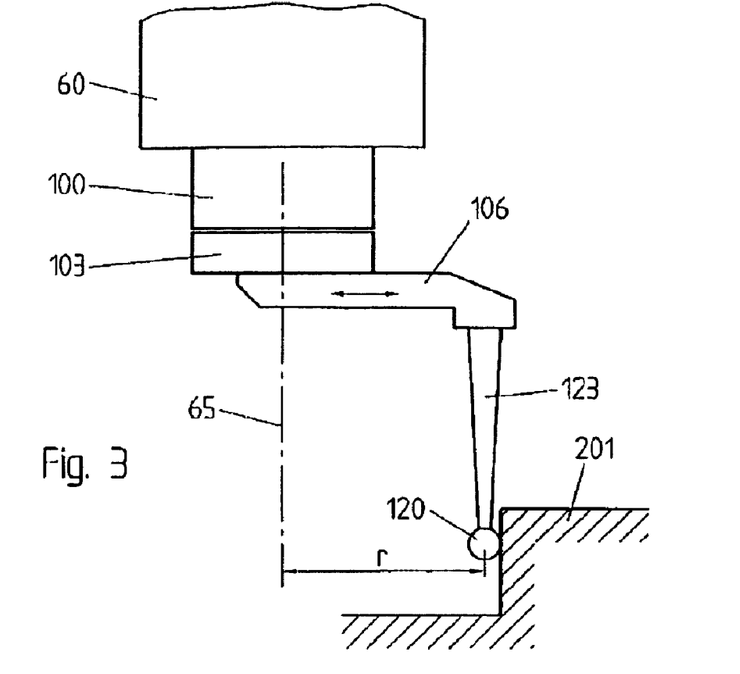
FIG. 3 shows a possible variant of the platform and probe of the invention.

Several variations to the probe are possible, in order to provide a larger range of movements of the probe with respect to the positioning platform 60. FIG. 3 presents a variant of a touch probe 103 according to the invention which is sensitive to a deflection of the displacement of the contact point in the horizontal direction. The probe comprises for example a slider 106, which can translate in the horizontal direction, which is the direction orthogonal to the rotation axis 65. The position of the slider 106 with respect to the base 103 of the probe is recorded by an appropriate encoder, not shown, for example a LVDT transducer, or any other appropriate transducer. The horizontal contact force between the sphere 120 and the surface 201 is determined by an appropriate actuator, not shown, as it is known in the art. The probe of FIG. 3 is able to follow a scan path in which the radius "r" of rotation around the axis 65 is not constant, within the limits of displacement of the slider 106.

Figure 4:
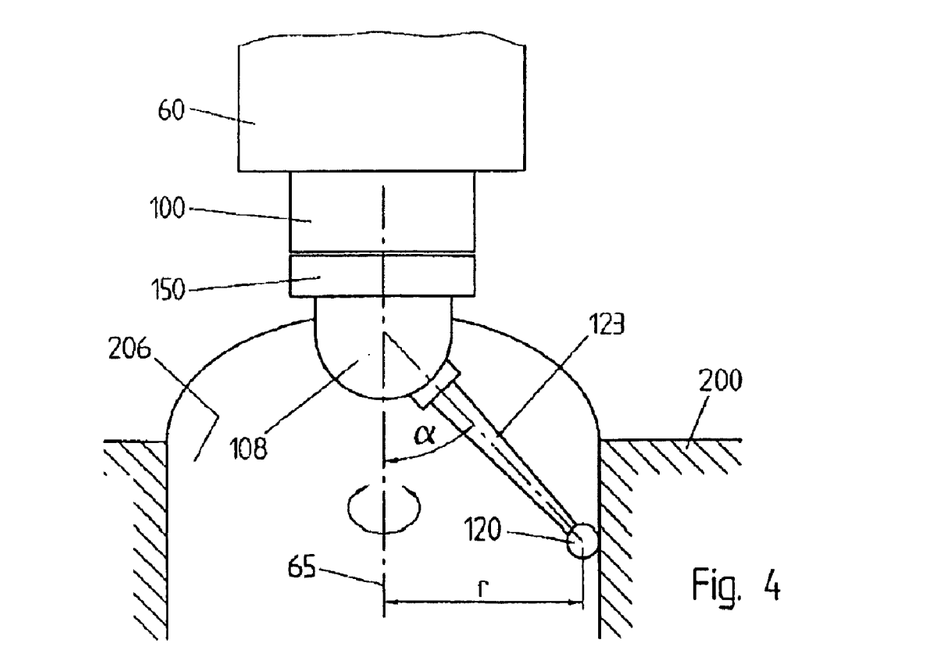
FIG. 4 shows another variant of a coordinate probe according to the present invention.

A further variant of a touch probe according to the invention is shown in FIG. 4. According to this embodiment, the stylus 123 is centrally fixed to the touch probe, and inclined, at an angle □ with respect to the vertical rotation axis 65. As a result the measuring point is offset, with respect to the axis 65 by a distance "r". Preferably, the inclination of the stylus can be set at will, by means of an appropriate actuator, not illustrated, in the rotor base 108. In a simplified version, however, the angle of inclination □ of the stylus 123 could be determined manually by the operator. By acting on the value of the inclination angle □ and to the length of the stylus 123, the offset radius "r" of the probe of FIG. 4 can be set at will, for example to scan an inner surface 206 of a cylindrical bore, as shown in figure.

The touch probes of the above-described embodiments are preferably deflection-sensitive probes, providing, at each desired moment of time, the deflection of the contact ball 120 relative to a nominal calibration position. The invention comprises the case of a single-axis probe, for example a probe sensitive to the displacement along a vertical-axis, as well as the case of a multi-axis probe, sensible to the three components of the displacements. The touch probe of the invention can comprise all manners of displacement sensors, for example electric, switches, inductive sensors, strain gauges, magnetic or optical displacement sensors.

Figures 5, 6:
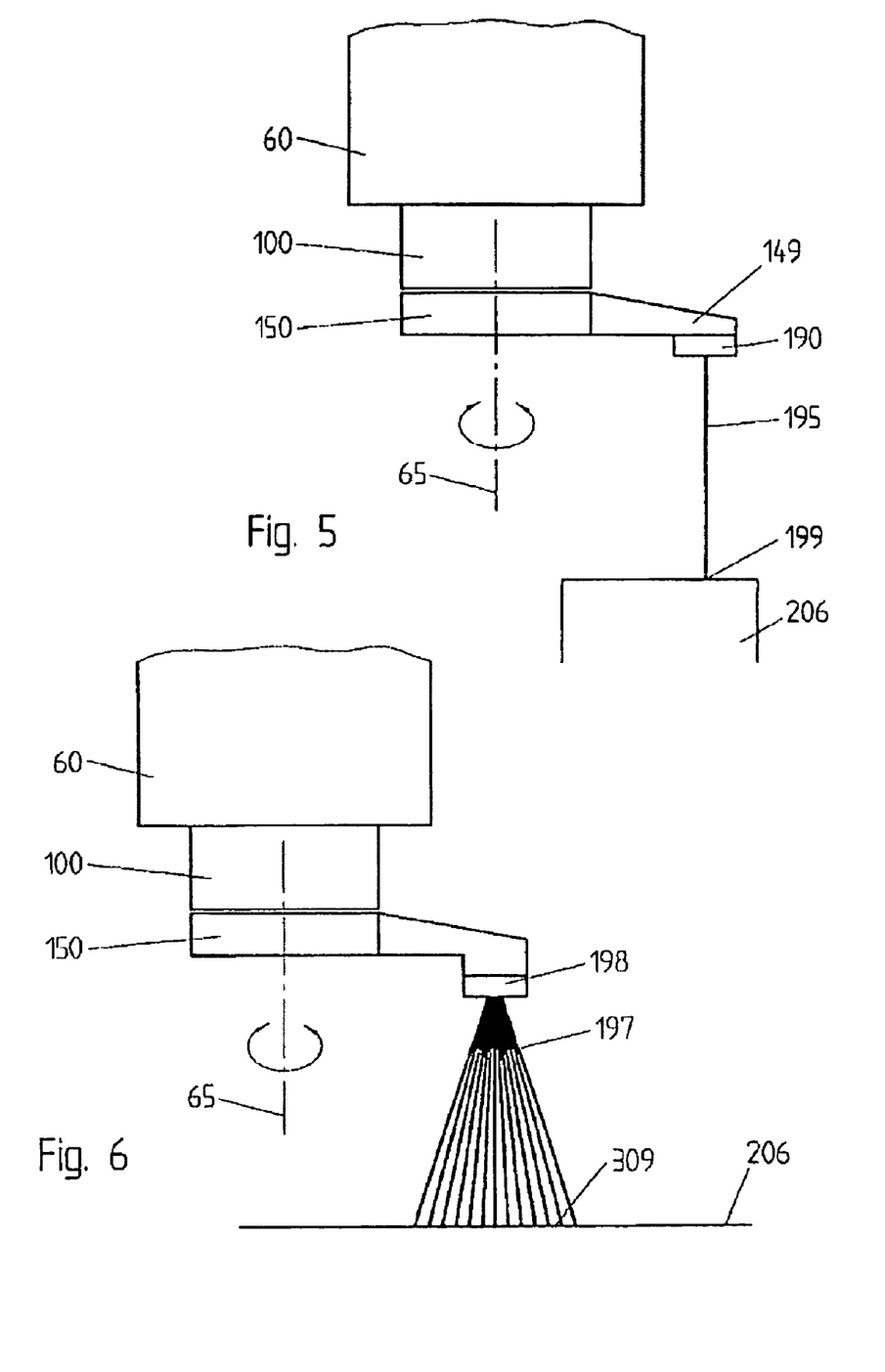
FIGS. 5 and 6 illustrate a variant of the present invention in which the positioning platform is equipped with contact-less movable probes.

Other variants of the invention, illustrated by FIGS. 5 and 6, comprise a laser probe 190, providing the distance between the probe head and the illuminated point 199 of the surface to be measured, taken along the light beam 195. As specified above, the measuring head 150 is mounted on the rotor 100 of the positioning platform 60, which can be selectively driven in rotation around the axis 65, for example coincident with the vertical "Z" coordinate axis. The measured point 199 is offset with respect to the rotation axis 65, by the arm 149. According to a non-represented variant of the invention, the same offset could be obtained by inclining a central laser probe by an angle, in a manner analogous to FIG. 4. FIG. 6 illustrates another variant of the invention including a multi-beam laser probe, or a fan optical probe, providing information on the coordinates of points along an illuminated line 309 on the measured piece 206. According to a further, non represented variant, the multi-beam laser probe could include a plurality of parallel vertical laser beams, (rake probe or comb probe), for example disposed vertically at different offsets from the rotation axis 65.

Figure 7:
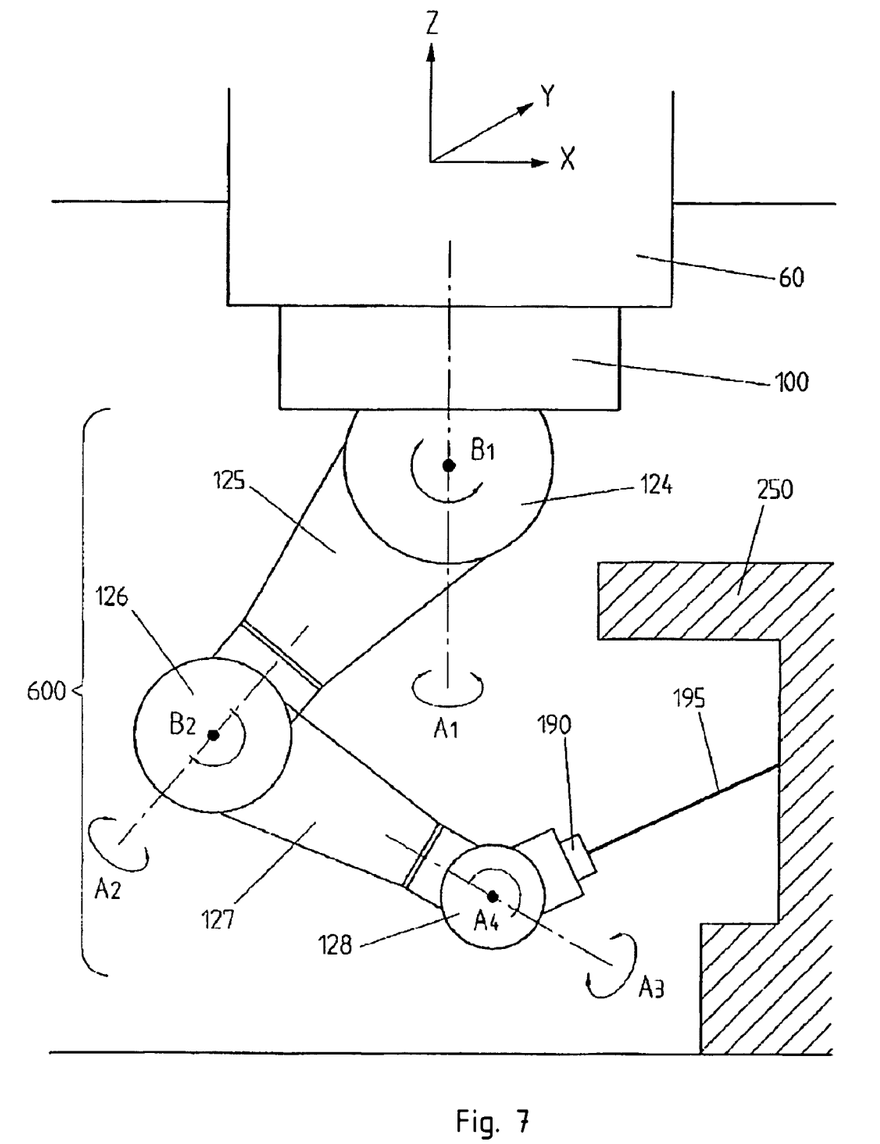
FIG. 7 shows schematically a probe movable by an arm comprising multiple articulated joints, according to another aspect of the invention.

FIG. 7 represents another aspect of the present invention concerning a multi-joint probe 600 and a coordinate measuring machine.

Figure 8:
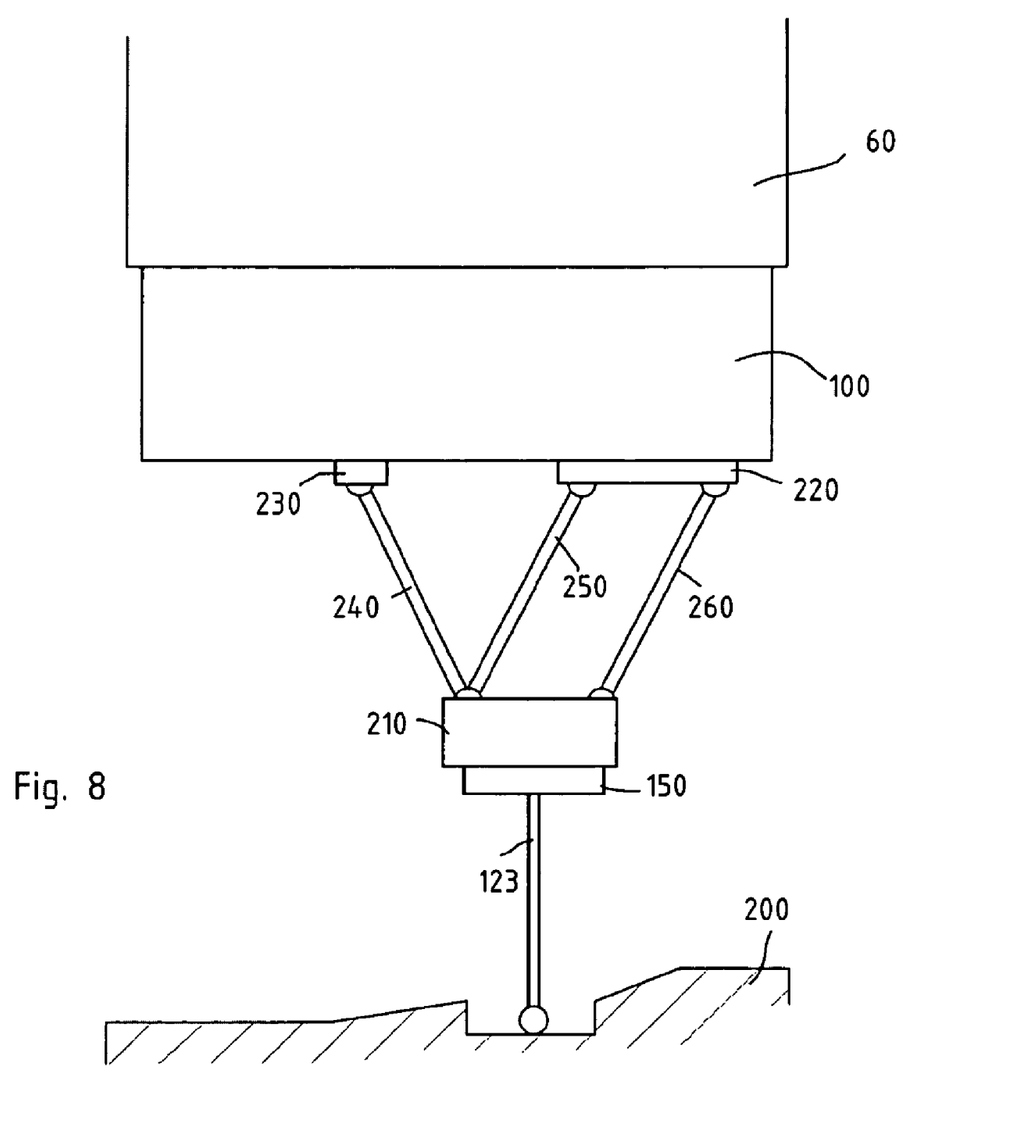
FIGS. 8 and 9 represent schematically a probe mounted on a positioning platform by two variant of actuators suitable for the realization of the present invention.

The device of the invention, partly illustrated in FIG. 8, comprises a movable positioning platform 60, as in the previous examples, which, for example, can be translated according to three orthogonal coordinate axes XYZ, as it is known in the art. The rotor 100 is rotatably connected to the platform 60, in a manner as to be able to rotate around a rotation axis A1, for example a vertical rotation axis parallel to the "Z" coordinate axis. The rotation means used to actuate the rotor 100 are analogous to those already mentioned in connection with FIG. 2 and will not be further described here.

The multi-joint probe 600 comprises a chain of rotation joints 124, 126 and 128 linked by rigid elements 125, 127. Preferably each joint comprises two independent orthogonal rotation axes, A, which can be set in rotation by appropriate actuators, for example electric motors, under the control of an appropriate digital controller. The rotation angles of the joint are also read by appropriate encoders, for example optical encoders. The encoded values are made available to the controller, which can then compute, at each moment, the position and orientation of the coordinate probe 190. In this variant the coordinate probe can be moved, relative to the positioning platform, in a full three-dimensional workspace and, additionally, can assume a plurality of orientations.

Figure 9:
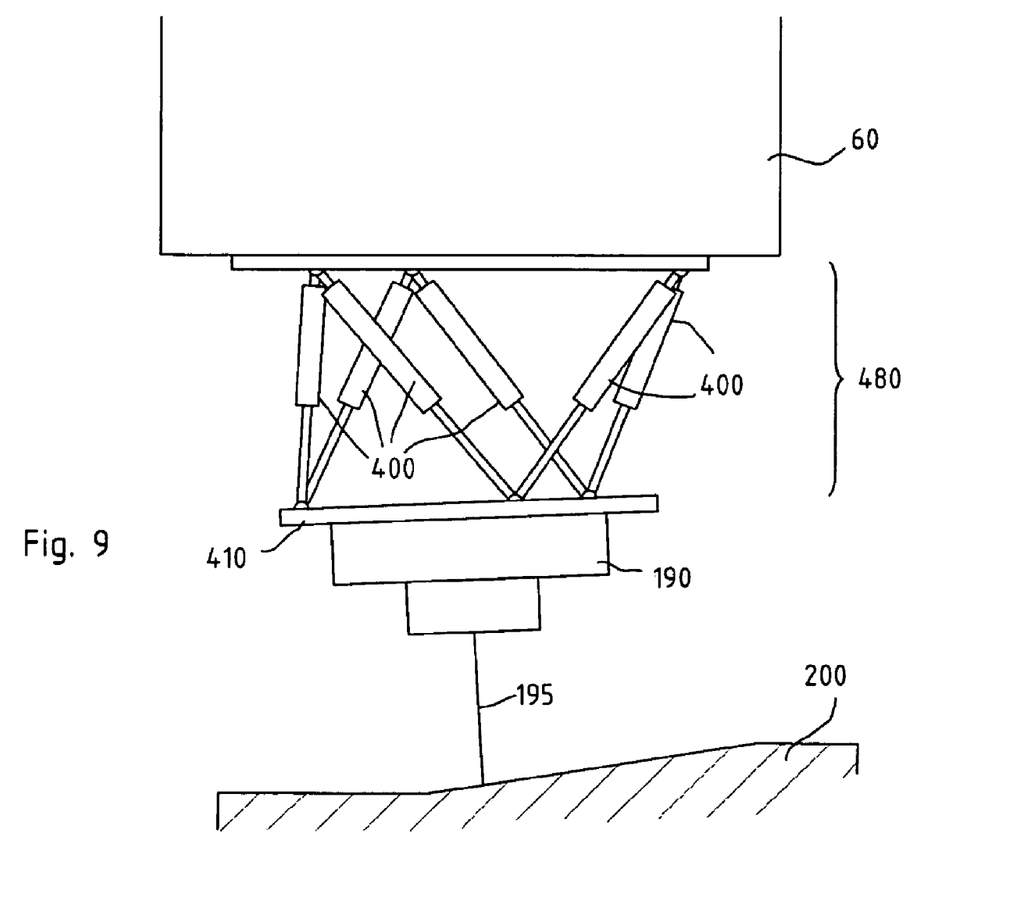

The invention also concerns parallel actuators, which are actuators comprising a base platform connected to an end platform by a number of linkages. Two examples of such actuators are shown in FIGS. 8 and 9. In such figures, same reference numbers have been used to indicate the same features already presented in previous figures. With respect to serial actuators, of which some examples have been shown above, parallel actuators can provide high stiffness and speed, in a limited workspace.

FIG. 8 represents a coordinate touch probe 150 connected to a rotor 100 by three rigid linkages 240, 250, and 260, The linkages are articulated on the end platform 210, holding probe 150, and on the rotor 100 in a manner as to allow pivoting around one axis along the direction "Y", orthogonal to the plane of the figure. On the rotor's side, the linkages are articulated to sliders 230 and 220 which can be moved along a horizontal slide, by appropriate actuators (not show), and whose position is measured by suitable encoders.

Linkages 250 and 260, connected to the same slider 220 constitute a parallelogram joint, which ensures the verticality of the probe 150. By moving sliders 230 and 220 in opposite directions, the probe 150 can be raised and lowered along the "Z" axis, while by moving sliders 230 and 220 in the same direction, the probe 150 is displaced horizontally. In this way, by combining the motion of sliders 220 and 230 with the rotation of rotor 150, the sensing tip of the coordinate probe, can be brought in any position in a three-dimensional workspace, and the probe can be steered to follow any path on the surface of the workpiece, without need to move the positioning platform 60. In this way an exact local measurement can be obtained, even if the platform 60 does not deliver the very best precision.

The contact probe 150 of FIG. 8 could as well be replaced by a contactless laser probe or by a camera or any kind other coordinate probe. On the other hand, it is not strictly required, if a contact probe is used, that this should be of the deflection-sensitive type. A simple touch-trigger probe could also be used. According to a non-represented variant, the slider 220 could be split in two independently movable elements, thus allowing inclining the probe 150.

Another kind of parallel actuator suitable for the realization of the invention is represented in FIG. 9. In this case a Stewart platform 480 comprising six telescopic struts 400 allows full control of the of position and orientation of the probe 190 (which is here represented as a laser probe, but could be any kind of coordinate probe) in a three-dimensional workspace. The telescopic struts 400 are connected to the positioning platform 60 and to end platform 410 holding the probe, by means of spherical and/or universal joints, and provide a holonomic prismatic connection between the positioning platform 60 and the probe 190.

According to one aspect of the invention, the measurement probe 150 or 103, be it a touch probe or a contactless probe, is moved by one or more actuators 500, 106, 108, in order to scan a path on the surface of a workpiece, while the positioning device 60 is kept at a standstill, in order to obtain a relative measure of coordinate points of such path. In this way the probe of the invention can provide accurate local measures of features on the workpiece (for example, diameter and depth of bores, surface condition, angles, inter-axis distance and parallelism, and so on), within the range spanned by actuators 500, 106, 108, and with respect to the positioning platform 60. Once the local measure is completed, the positioning platform 60 moves to another chosen position, and the probe 150, 103 takes another local measure, again within the range spanned by actuators 500, 106, 108.

In general, local measures taken at different position, i.e. involving a displacement of the positioning device 60, can be put in relationship only accepting an additional error, due to the imprecision of the positioning device 60. Whenever two local measures overlap, however, the error of the positioning device can be calculated, by comparing the coordinates of corresponding features in both measurement sets, and corrected for.

Figure 10:
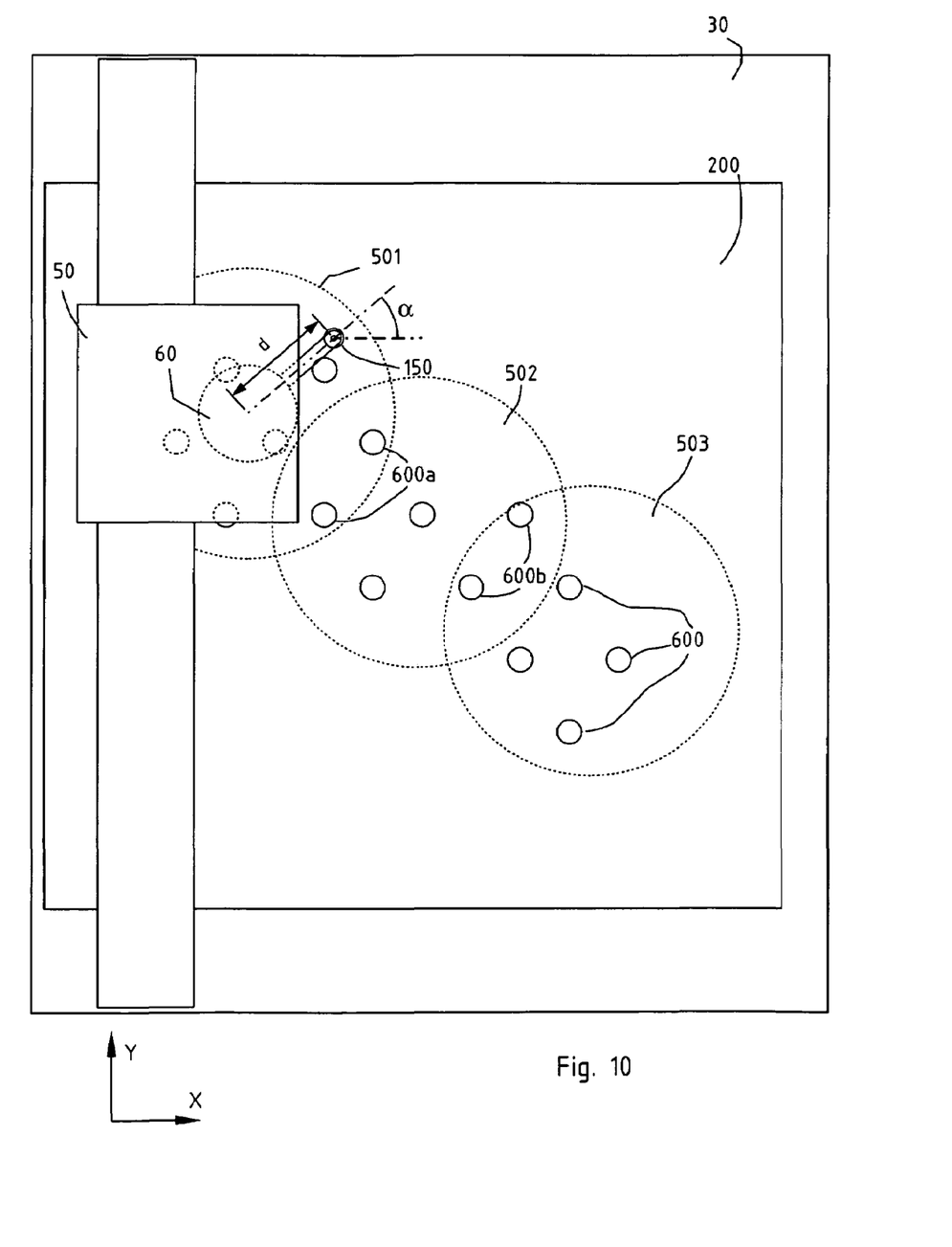
FIG. 10 shows, schematically, an example of measure according to one aspect of the invention.

FIG. 10 represents, in top view, an example of measure according to one aspect of the invention. The positioning platform 60, here represented in a form similar to that of FIG. 3, is mounted on the spindle 50 of a positioning machine (represented only in part). The positioning machine could be a coordinate measuring machine, an industrial manipulator, a robot, a tool holder of a machine tool, or any other positioning apparatus. The positioning platform 60 should preferably be capable of autonomous movements, under the action of motors or suitable actuators. This is not however a necessary feature of the invention. The positioning platform 60 could be moved, for example, by a manually operated machine tool.

Preferably, however, the positioning platform 60 is capable of movement along three independent directions relative to the fixed base 30, and can be positioned at will within a three-dimensional global measure space. The motion of the positioning platform 60 is measured, with respect to some reference structure, If the positioning platform is connected to a CMM, for example, its displacements will be known, by means of appropriate encoders of the CMM, with respect to the fixed base 30 of a CMM: If, on the other hand an industrial robot is used, the position of the platform 60 will be known at any time with respect to the fixed base of the robot, in general resting on the workshop's floor. Preferably, the motion of the positioning platform 60 will be determined by a program, running in a digital controller, and the same controller is also responsible of the positioning of the probe with respect to the positioning platform.

Figure 11:
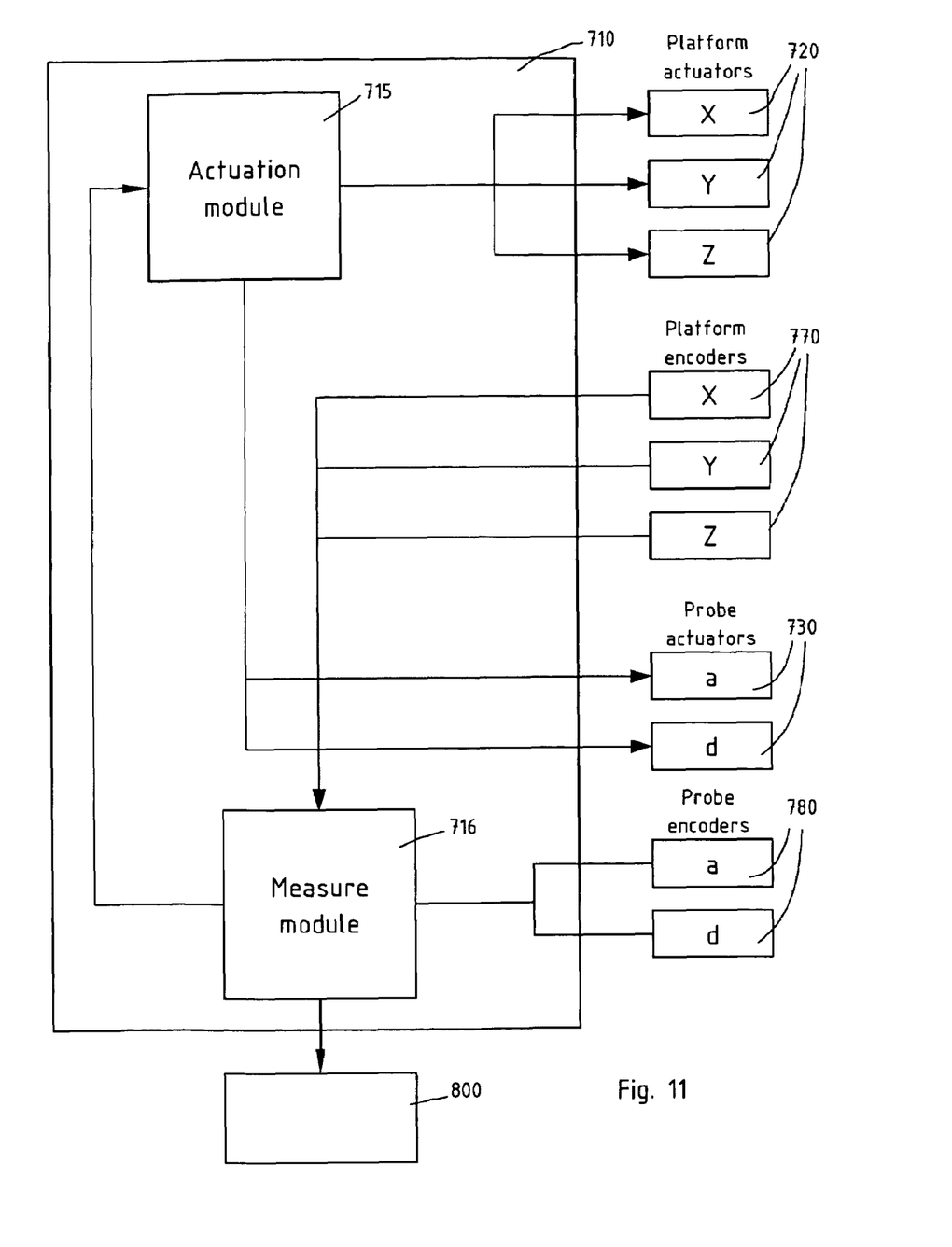
FIG. 11 represents, in a very simplified block schematic form the organization of the dataflow in a system according to one example of realization of the invention.

FIG. 11 shows, in block schematic form, the organization of the dataflow in a system according to one example of realization of the invention. A digital processor 710 comprises an actuator module 715 and a measure module 716, which are, in this example, two distinct software modules comprised in a program executed by the processor's logic unit. According to other variants, the measure module and the actuation module may relate to two physically separated connected controllers, or their functions may be carried out by a combined software module.

The actuation module controls the various actuators which determine the movements of the positioning platform 60, relatively to a fixed reference frame, for example the fixed base 30, and the probe relative to the positioning platform 60. In the example shown, which relates to the case of a probe similar to that of FIG. 3 and of a CMM as represented in FIG. 1, the position of the platform 60 is done by platform actuators 720x, 720y, 720z; the relative position of the probe is determined by the two axes □ and d, respectively operated by probe actuators 730a and 730d.

Measure module is sensitive to the reading of platform encoders 770x, 770y, 770z, which convey positional information along axes XYZ, for the position of the positioning platform 60 relative to the fixed base 30, and probe encoders 780a and 780d, giving the position of the probe relative to the positioning platform 60, as determined by values of □ and d. The number of coordinate axes and their signification may vary, within the frame of the present invention, according to the kinematics arrangement used.

Measure module uses the output of probe encoders 780a and 780d to obtain local measures and coordinates of points on the workpiece, measured in the relative coordinate frame of the positioning platform 60.

Optionally, the measure module 716 can use the output of the platform encoders 770X, 770Y, 770Z, to transform the measures and coordinates from the relative coordinate frame of the positioning platform 60 to the absolute coordinate frame of the fixed base 30. The results are delivered to a display and/or storage unit 800 and may optionally be fed back to the actuation module 715.

Referring again to FIG. 10, probe 150 is mounted on, and is capable of autonomous movements relative to, the positioning platform 60. In this example the probe is mounted on a rotor, as shown in FIG. 3, and its axial displacement is variable. By varying the angle of rotation □ of rotor and axial displacement d, the probe can be controlled to take precise coordinate measures of points of the workpiece 200, in a local workspace 501, accessible to the probe while keeping the positioning platform 60 immobile. The probe is controlled to measure any desired feature within the workspace 501, for example, diameters and axis location of bores 600.

Once the measure in workspace 501 is completed, positioning platform 60 is moved to a second position. This time the workspace 501 is accessible to the probe and a second local measure is taken. Platform 60 is then moved to a further position 503 and so on, as needed.

When only local features are needed, like for example in measures of diameters, angles, relative distances, or surface status, there is no necessity to combine local measures taken in two different local workspaces, therefore the positioning error of the platform 60 does not affect the results.

When the measure involves taking a map of coordinate points, such map can be expressed, in each local workspace 501, 502, 503, as coordinates relative to the positioning platform 60. If a global map, spanning several local measurements is needed, the positioning error of the platform 60 must be reckoned with when connecting local measurements. In some case, when local workspaces overlap, like in the FIG. 10, the positioning error of the platform 60 can be solved by comparing coordinates of the same feature in the two local measurements.

In this case, the method of the invention will comprise a step of connecting together two or more local measurements, to obtain a global measurement. In the context of the present invention, a global measurement is a set of measure data, expressed in a common reference frame, corresponding to features lying in different local workspaces of different local measurements.

Referring to FIG. 10, for example, the positioning platform 60 moves, along X and Y directions in three different positions in order to obtain local measurements 501, 502, 503. The workpiece 200 is sufficiently flat that no motion of the positioning platform in the vertical Z direction is necessary in this case. The displacement vectors of positioning platform 60 are only roughly known. In each of the local measurements 150, 151, 152, the probe 150 takes the axes coordinates and diameters of all the bores 600 within reach.

Each of the local measurements 501, 502 and 503 provides a series of diameter values for the bores 600. Diameters are intrinsically relative quantities, and their measures do not depend from the coordinate frame in which they are taken. The method allows a precise measure of the diameters of bores 600, even if the absolute position of the probe is not exactly known. Of course the method allows direct determination of any relative metrologic quantity which can be obtained by the probe 150 alone. Such relative quantities include, among others angles, orthogonality, flatness, parallelism, eccentricity, and so on.

Local measurements 501, 502 and 503 also provide, for example, the axes of the bores 600 within each respective range. They may be represented, for example by pairs of X and Y coordinates in a relative reference frame moving together the positioning platform 60. In this case coordinates of points belonging to the same local measurement can be directly compared, for example point distances can be calculated directly. Coordinates of points belonging to different local measurements, on the other hand, can not be compared directly, because they are expressed in different reference frames, and the motion of the positioning platform 60, which would allow transformation between such reference frames, are only imperfectly known.

Importantly, bores 600a are comprised in the overlapping of local measures 150 and 151; bores 600b lie in the overlapping region of measurements 151 and 152. Thanks to this, it is possible to obtain, by comparing the coordinate of axes of bores 600a and 600b, the geometric transformation between the coordinate frames of local measures 150 and 151, respectively 151 and 152. In this way the system of the invention is able to connect local measurements 150, 151, and 152 in one global measurement.

It should be noted that, in the above example, the movement of the positioning platform 60 involved only two independent degrees of freedom X and Y. Hence, displacements of the positioning platform 60 can be correctly determined by comparing the X and Y coordinates of an adequate number of points in the overlapping region of the local measurements. The skilled person is able to extend this method to the general case in which the motion of the positioning platform 60 is described by several independent degrees of freedom, for example three translation parameters and three rotation angles. It is also clear that the method of connecting local measurements into a global measurement of the invention is not limited to the use of round bores, but could be extended by the skilled person to use different measurable features, for example ledges, protrusions, and so on.

In the example of FIG. 10, the workpiece 200 included originally a sufficient number of overlapping features, in this case the bores 600, to allow the connection of local measurements. It may be the case, however, that the recognizable features of the workpiece 200 are too sparse to allow connection of the local measurements. In this case, if necessary, a certain number of reference features can be artificially added to the workpiece 200, before the measurements are taken, to ensure that each local measurement includes an adequate number of overlapping features.

Such reference features, for example reference spheres, cylinders, or prisms, can be permanently or temporarily attached to the workpiece, and preferably removed after the measurement. Attachment may be magnetic, adhesive, or any other form of attachment. If an optical probe is used, the reference features could be optical targets, for example on adhesive labels. The skilled person will understand that it is not important, for the invention, that the additional features should be placed very precisely, provided that their position is stable.

The method and system of the invention are therefore especially useful when a precise measuring probe 150 is combined with a positioning platform 60, having a lesser degree of precision. For example a coordinate probe mounted on an industrial robot. Another useful application of the method of the invention is when the positioning platform is capable of precise motion, but it is slow, or difficult to use, or can not be easily interfaced with the controller of the coordinate probe 150. Such is the case, for example, when a coordinate probe is mounted on a manually operated machine tool. Therefore the method of the invention allows in this case an efficient measure, with a minimal intervention of the operator.

The method of the invention thus involves a measuring coordinate probe, which can be moved precisely, by appropriate actuators, with respect to a positioning platform 60 on which the probe is mounted; and whose position relative capable to said positioning platform 60 can be measured, by suitable encoders. It is clear that the invention can be carried out with probes, actuators and encoders of different nature.

Even if this is not an essential feature of the invention, the actuators preferably allow the motion of the probe according to two or more independent degrees of freedom, so that the probe itself can be moved in a plane, or in a three-dimensional region of space, and its orientation can be chosen, within some suitable limits.

The invention claimed is:

1. A method for measuring coordinates on a workpiece using a coordinate probe movably connected to a positioning platform by means of one or more actuators, the position of the probe relative to the positioning platform being measurable by probe encoders, the method involving, in any suitable order, the steps of:
    moving the positioning platform with respect to a fixed reference to a predetermined location;
    controlling said actuators to move the coordinate probe relative to the positioning platform, while keeping the positioning platform immobile in the fixed reference, to sense the surface of a workpiece in a local workspace accessible to coordinate probe;
    obtaining a local measurement of the workpiece by combining said measure data with probe position data provided by said probe encoders;
    moving the positioning platform with respect to a fixed reference to a different location.

2. The method of claim 1, wherein said local measurement comprises taking a map of coordinate of points on the surface of the workpiece, relative to the positioning platform.

3. The method of claim 2, further involving a step of reading the output of platform encoders providing the coordinates of said positioning platform with respect to said fixed reference, and a step of transforming said coordinate of points relative to the positioning platform into coordinate of points relative to said fixed reference.

4. The method of preceding claims 1, wherein said local measurement comprises obtaining local dimensions, for example diameters, angles, or relative distances.

5. The method of claim 1, wherein the steps of controlling said actuators to move the coordinate probe and obtaining a local measurement are repeated, at different positions of the positioning platform, further comprising a step of obtaining a global measurement by connecting together two or more local measurements.

6. The method of claim 5, further comprising the steps of:
    selecting, in said local measurements, reference measure data corresponding to overlapping regions common to two or more local workspaces of two or more local measurements,
    computing a relationship between said local measurements based on said reference measure data.

7. The method of claim 6, further comprising the step of placing temporary reference elements on said workpiece, and wherein said reference measure data are selected from measures of said temporary reference elements.

8. The method of claim 1, wherein said steps of moving said positioning platform relative to said fixed reference comprise acting on a plurality of platform actuators.

9. A dimension measuring system comprising:
    a coordinate probe movably connected to a positioning platform by means of one or more actuators, the position of the probe relative to the positioning platform being measurable by probe position encoders,
    an automatic controller, controlling to said actuators, and sensitive to the output of said encoders, having a program memory storing a program to carry out the steps of any of the methods of claim 1.

10. The system of claim 9, wherein said positioning platform has a larger range of movement than the range of movement of the coordinate probe.

11. The system of claim 10, wherein coordinate probe is driven by said actuators in a three-dimensional workspace.

12. The system of claim 11, wherein said positioning platform is a manually positionable arm, or a coordinate positioning machine, or a robot arm, or a machine tool.

13. The system of claim 9, wherein the position of said positioning platform is determined automatically by the controller running the stored program and acting on platform actuators.

14. The system of claim 13, wherein said positioning platform can be moved according to three independent axes (XYZ).

* * * * *